Dec. 8, 1964   A. Q. MOWATT   3,160,132
METHOD OF AND APPARATUS FOR MANUFACTURING
HEAT-DISSIPATING INSERTS AND THE LIKE
Original Filed Nov. 21, 1957   4 Sheets-Sheet 1
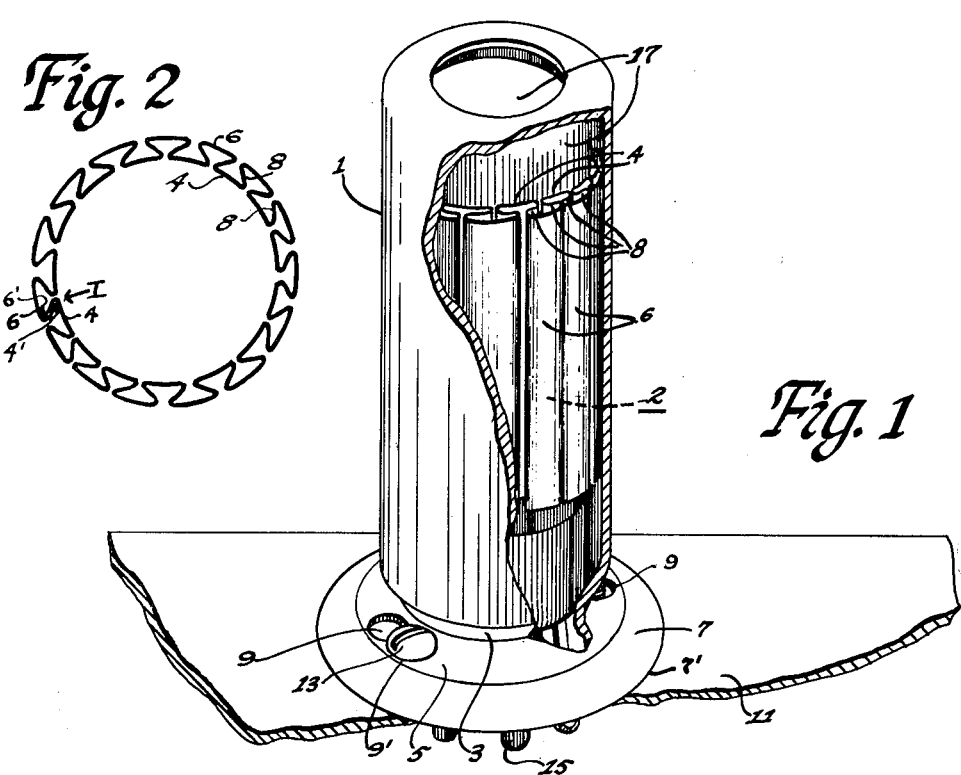
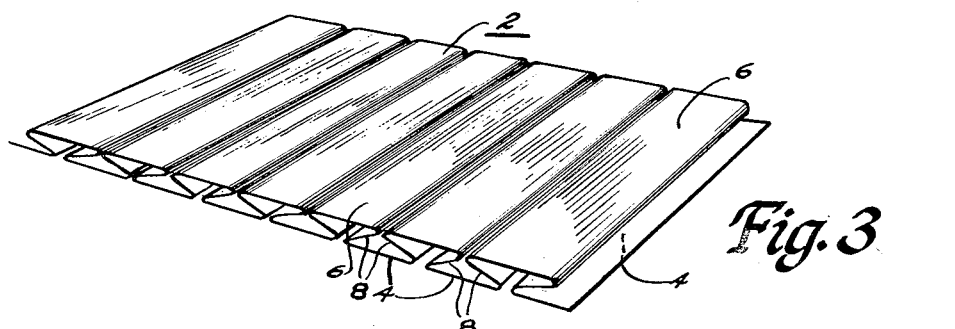
INVENTOR.
ALLAN Q. MOWATT
BY Rines and Rines
ATTORNEYS INVENTOR
ALLAN Q. MOWATT
BY Rines and Rines
ATTORNEYS

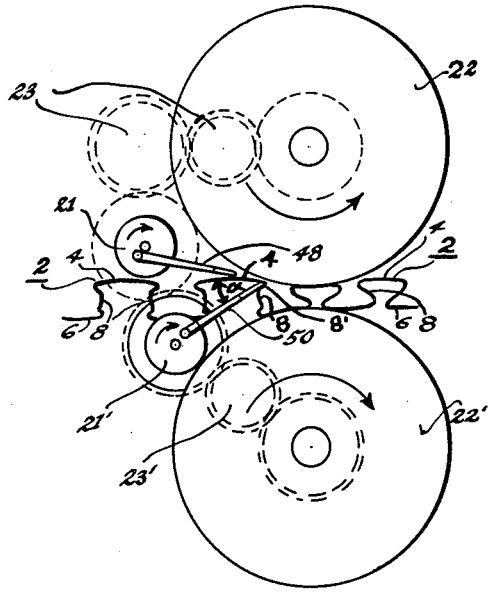
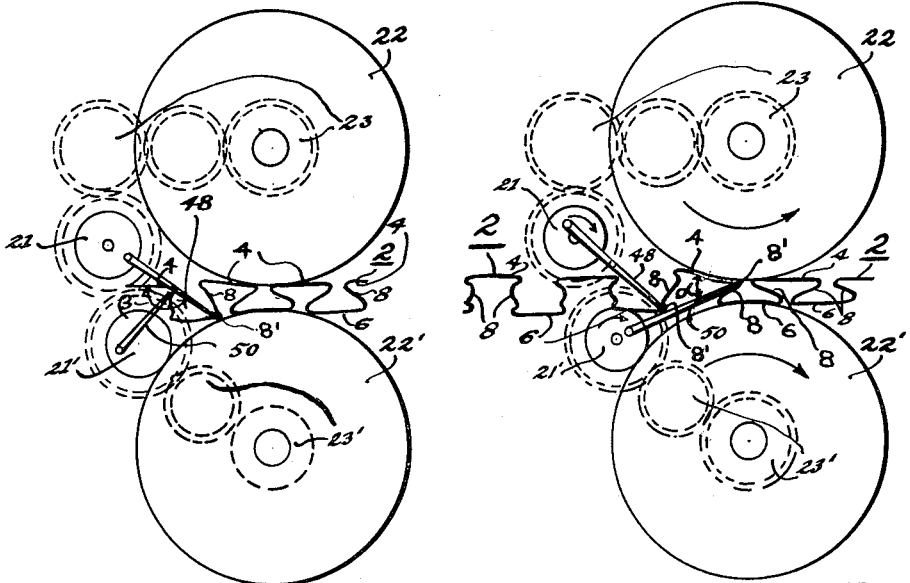

Dec. 8, 1964  A. Q. MOWATT  3,160,132
METHOD OF AND APPARATUS FOR MANUFACTURING
HEAT-DISSIPATING INSERTS AND THE LIKE
Original Filed Nov. 21, 1957  4 Sheets-Sheet 4

INVENTOR.
ALLAN Q. MOWATT
BY Rines and Rines
ATTORNEYS ns, 3,160,132
Patented Dec. 8, 1964

3,160,132
METHOD OF AND APPARATUS FOR MANUFACTURING HEAT - DISSIPATING INSERTS AND THE LIKE
Allan Q. Mowatt, Lexington, Mass., assignor to Atlee Corporation, a corporation of Massachusetts
Original application Nov. 21, 1957, Ser. No. 697,865, now Patent No. 3,005,036, dated Oct. 17, 1961. Divided and this application Sept. 19, 1960, Ser. No. 56,743
5 Claims. (Cl. 113—118)

The present invention relates to methods of and apparatus for manufacturing heat-dissipating inserts and the like, and, more particularly, inserts adapted for use with electron tubes and similar devices. This application is filed in response to a requirement for restriction in copending application, Serial No. 697,865, filed November 21, 1957, now Patent No. 3,005,036, for Heat-Dissipation Shield, Insert and Method, and is a division of the said copending application.

While, for purposes of illustration, the invention will be described in connection with its important application to electron tubes, moreover, it is to be understood that it is also adapted for use with other types of electrical components or other heat-generating devices wherein the hereinafter-described results obtainable with the invention may be desired. The phrase "electron tubes and the like" is therefore employed generically to connote all such devices.

Numerous proposals have been offered throughout the years for dissipating heat generated by electron tubes and the like. Where glass-envelope tubes are employed in electronic equipment, for example, it is frequently vitally important to dissipate the heat generated within the tubes during their operation in order to avoid deleterious effects to the tubes and to surrounding electrical components, particularly if such tubes and components are confined to relatively small spaces. Since the glass walls of the tube envelope cannot efficiently radiate heat to the air surrounding the same, various types of tube clamps and inserts have been evolved for conducting the heat from the walls of the tube envelope to a surrounding conductive shield housing that not only effectively radiates heat into the air, but, through contact with a conductive chassis upon which the tubes and shields may be mounted, can dissipate heat by conducting the same to the chassis. Included in such devices are complicated and relatively expensive spaced multi-finger clamps and corrugated resilient inserts, both of which, unfortunately, do not contact substantially all portions of the lateral surface area of the electron tubes and hence do not dissipate heat from substantially all such portions.

An object of the present invention, accordingly, is to provide a new and improved method of and apparatus for manufacturing a novel heat-dissipating insert that shall not be subject to the above-mentioned disadvantages but that, in summary, shall provide for the conducting of heat from substantially all portions of the lateral surface area of the electron tubes and the like to the shield and shall permit of efficient heat transfer from the shield to the chassis.

Other and further objects will be explained hereinafter and will be more particularly pointed out in the appended claims.

The invention will now be described in connection with the accompanying drawing, FIG. 1 of which is a perspective view, partly broken away, illustrating the employment of a preferred insert manufactured in accordance with the present invention;

FIG. 2 is a top elevation of the assembled insert only of FIG. 1;

FIG. 3 is a perspective view of the said insert before assembly in the apparatus of FIG. 1;

FIGS. 6, 7 and 8 are side elevations, upon a somewhat different scale, illustrating successive positions of the portion of the manufacturing apparatus of FIG. 5.

Figure 4:
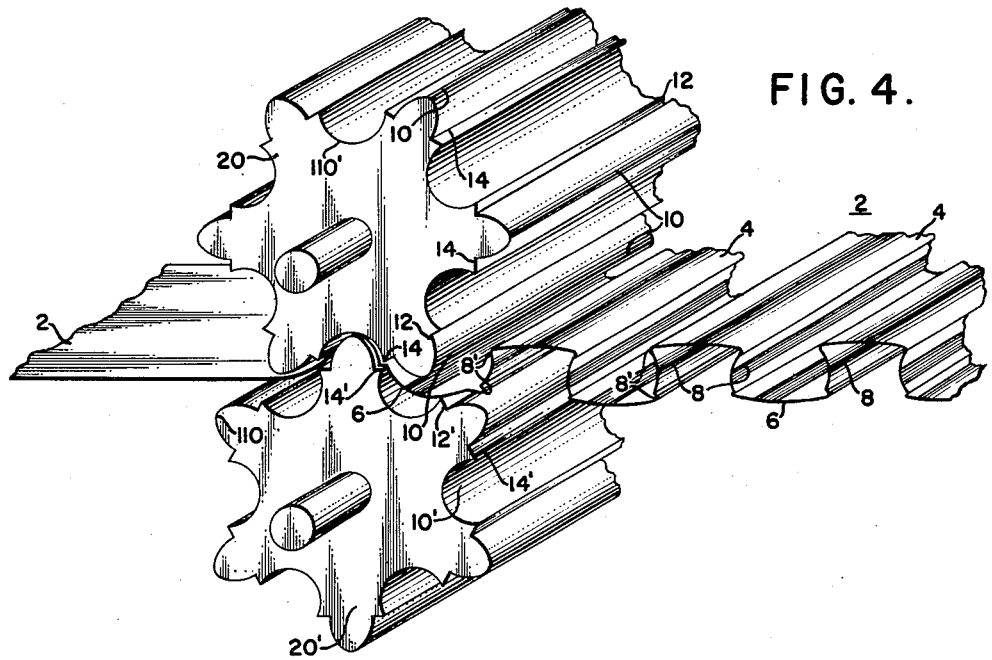
FIGS. 4, 5 and 9 are similar views of three steps in the manufacture of the insert.
Figure 5:
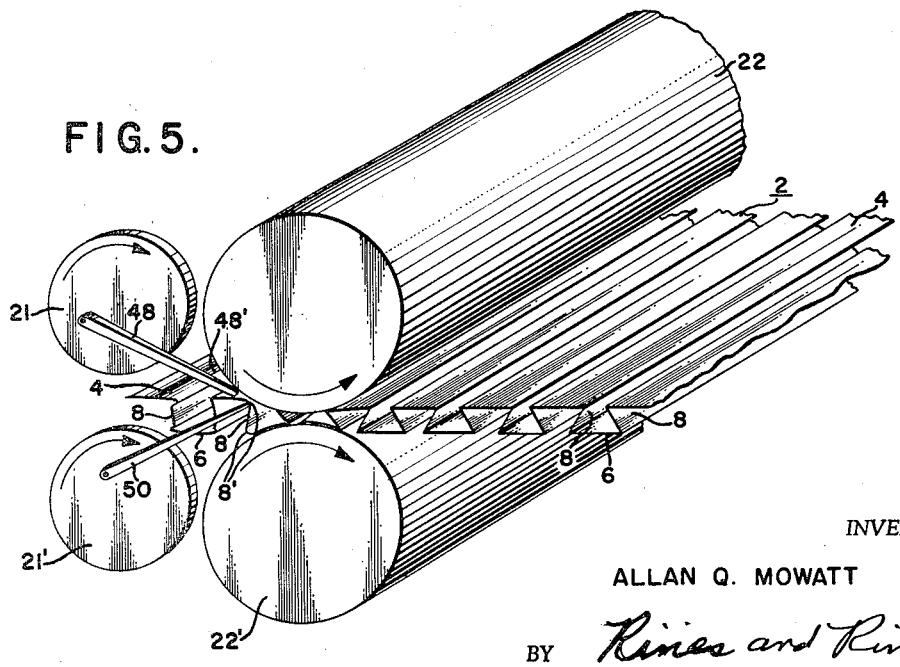

For illustrative purposes, a typical substantially cylindrical-envelope electron tube is shown at 17, FIG. 1, mounted in conventional fashion with its electrode pins, not shown, received within a tube socket 15 disposed upon a conductive chassis 11. A resilient sheet-metal heat-conductive insert 2 is disposed between the lateral outer-wall cylindrical surface of the tube envelope 17 and the inner wall of an outer conductive cylindrical shield housing 1. The insert 2, in accordance with the method of the present invention, is formed into a plurality of successively disposed folds. Each fold is substantially triangular in cross-section, such as the triangular fold formed by the flat base region 6 with its adjacent triangle side walls or legs 8, 8, and the adjacent triangular fold formed by the flat base region 4 and the corresponding triangle legs 8, 8, FIGS. 1 and 3. The term "triangular" is a convenient term generally descriptive of the shape of the folds even though the legs 8 may or may not quite touch to form a vertex, and it is intended to embrace, also, those cases where the legs 8 may approach parallelism with the base regions 4 and 6. Adjacent folds, moreover, are oppositely oriented, the alternate-triangle flat base regions 6 being shown facing outwardly in FIG. 1 and upward in FIG. 3, and the remaining base regions 4 being shown facing inwardly toward the tube surface 17 in FIG. 1, and downward in FIG. 3.

Because of this substantially triangular construction, as contrasted with prior-art rectangularly corrugated inserts, when the resilient insert 2 is compressed and disposed between the tube 17 and the outer shield housing 1, the flat base regions 6 of alternate folds become almost contiguous with one another, as do the flat base regions 4 of the remaining folds. An almost contiguous cylindrical heat-conductive surface formed by the base regions 4 thus contacts substantially all of the lateral cylindrical surface area of the tube envelope 17. A similar almost contiguous cylindrical surface formed by the insert base regions 6 contacts substantially the complete surface area of the inner wall of the shield 1. Heat is thus effectively conducted from substantially all points of the lateral surface of the tube 17 to the shield 1, dissipating more heat than the before-described prior-art clamps or inserts which do not provide heat-conducting paths from so much of the tube surface area as is provided by the present invention.

As an illustration of the effectiveness of the novel substantially full-surface-area heat-conductive insert 2, as compared with rectangular-corrugated inserts, type 5687WA tubes have been found to operate at from about 15° to 20° centigrade less maximum temperature over a sink temperature range of from 20° to 70° centigrade. At a sink temperature of about 60° centigrade, for example, the tubes will achieve a maximum temperature of about 126° centigrade with the prior-art inserts, but a lesser maximum temperature of about 109° centigrade with the insert 2 of FIG. 1.

Figure 10:
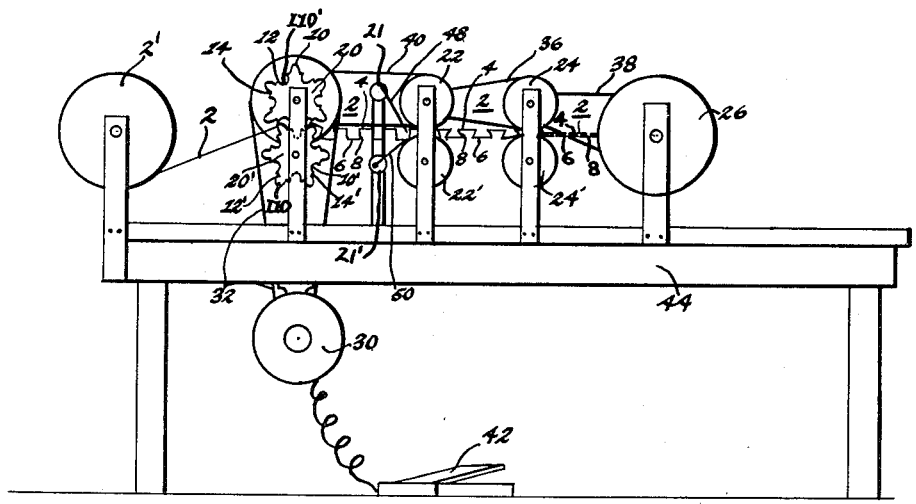
FIG. 10 is a side elevation of the complete assembled apparatus of FIGS. 4, 5 and 9.

The insert is preferably formed in accordance with the present invention, by passing a flat sheet 2 of resilient bronze or other similar material through cooperating scalloped steel rolls 20 and 20', FIGS. 4 and 10. The sheet material 2 may be fed from a roll 2', as shown in FIG. 10. The scalloped roll 20 is provided with periodic major ribs 10, that cooperate with major depressions 10' of the roll 20', and, on one side, adjacent minor ledges 12 cooperating with corresponding regions 12' on the roll 20'. On the other side of the ribs 10, the roll 20 is provided with another ledge 14, similar to the ledge 12, for cooperating with a ledge 14' on the roll 20'. The roll 20' similarly is provided with major ribs 110 between the depressions 10' for cooperating with corresponding depressions 110' in the roll 20. In passing through the rolls 20 and 20', therefore, the sheet 2 is periodically depressed by the ribs 10 within the depressions 10' to form a substantially flat neck of a lower U-shaped fold at 6, and, by the ribs 110, within the depressions 110', to form a substantially flat neck of an upper U-shaped fold at 4 (substantially parallel to the flat neck 6). The ledges 12–12', 14–14' serve to bow or set the side walls 8 outward for a purpose later explained, and form slight upper and lower transverse recesses 8'.

The resulting U-shaped corrugated sheet is then fed through upper and lower preferably rubber rolls 22 and 22', FIGS. 5 through 8, and are acted upon by upper and lower arms 48 and 50, mounted eccentrically upon cam shafts 21 and 21' which may be driven in the same direction and synchronously with the oppositely rotating rolls 22 and 22' through the medium of gear trains, shown dotted at 23 and 23' in FIGS. 6, 7 and 8. The arms 48 and 50 have blades extending transversely of the sheet 2, as more particularly shown at 48' in FIG. 5. As illustrated in FIG. 6, the relative positioning of the arms 48 and 50 upon the cam shafts 21 and 21' is such that the arm 50 will engage the upper transverse recess 8' of a side wall 8 to the right of a flat neck region 4, while the arm 48 rides over the region 4. Rotation of the cam shaft 21' clockwise, in the direction of the arrow illustrated thereupon, causes the arm 50 to press upwardly at an acute angle $\alpha$, FIGS. 6 and 7, against the upper recess 8' of the outwardly set or bowed wall 8, so that the rolls 22 and 22' will form the left-hand inwardly inclined leg 8 of the triangular fold 8–6–8. Meantime, the arm 48 has dropped, FIG. 7, engaging the lower transverse recess 8' of the wall 8 to the left of the flat neck region 4. Further rotation of the cam shafts 21, 21', FIG. 8, results in the arm 48 pressing downward against the lower transverse recess 8' at an obtuse angle $\beta$, forcing the same inward to form the left-hand leg 8 of the triangular fold 8–4–8.

Figure 9:
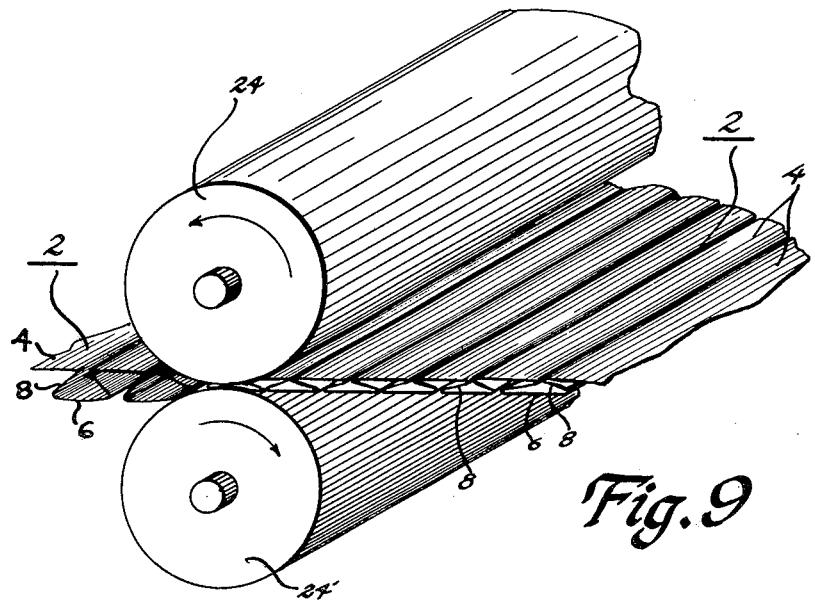

The preferably isosceles triangular folds 8–4–8, 8–6–8 are thus formed and, as shown in FIGS. 9 and 10, they may be further flattened for ultimate use by passing the same through presser rolls 24, 24'. The formed material 2 may be wound on reels 26, FIG. 10, and then cut to the desired insert size. The present construction, moreover, provides for easy assembly in ring form with the triangle ends of the cut-insert interlocking as at I, FIG. 2, where, preferably, a little section 6' at the cut is interlocked within a triangular fold 8–6–8, and a similar fragmentary section 4' is interlocked within an adjacent fold 8–4–8. A preferred driving mechanism is illustrated in FIG. 10, wherein a motor 30, electrically operated as by a foot-pedal switch 42, may drive the rolls 20–20', 22–22', 24–24' and 26, mounted upon a machine chassis or table 44, through the medium of belts or chains 32, 40, 36 and 38, respectively. Any other well-known gear or other drive mechanism may also, of course, be employed.

When the preferred shield 1 is employed, furthermore, additional heat-dissipating efficiency is obtained since the shield 1 is directly secured with an excellent heat-transfer junction to the conductive chassis 11, FIG. 1.

Further modifications will occur to those skilled in the art and all such are considered to fall within the spirit and scope of the invention as defined in the appended claims.

What is claimed is:

1. A method of the character described that comprises, corrugating a thin sheet into a plurality of successive substantially U-shaped folds with adjacent folds inverted with respect to one another, the neck of each U being substantially flattened, rolling the necks of successive folds toward each other, and pressing in the direction of the rolling successively against the adjacent side walls of each successive U-shaped fold along directions making successive acute and obtuse angles with respect to the flattened neck to form the fold into substantially triangular shape.

2. A method of the character described that comprises, corrugating a thin sheet into a plurality of successive substantially U-shaped folds with adjacent folds inverted with respect to one another, the neck of each U being substantially flattened, rolling the necks of successive folds toward each other, and pressing in the direction of the rolling successively against the upper and lower ends of adjacent side walls of successive U-shaped folds along directions making successive acute and obtuse angles with respect to the flattened neck to form the folds into substantially triangular shape.

3. A method of the character described that comprises, corrugating a thin sheet into a plurality of successive substantially U-shaped folds with adjacent folds inverted with respect to one another, the neck of each U being substantially flattened, rolling the necks of successive folds toward each other, bowing the side walls of the U with recesses at the upper and lower extremities of the side walls, and pressing in the direction of the rolling successively against the upper and lower recesses of the adjacent side walls of successive U-shaped folds along directions making successive acute and obtuse angles with respect to the flattened neck to form the folds into substantially triangular shape.

4. Apparatus of the character described that comprises, means for corrugating a thin sheet into a plurality of successive substantially U-shaped folds with adjacent folds inverted with respect to one another, the neck of each U being substantially flattened, means for bowing the side walls of the U with recesses at the upper and lower extremities of the side walls, roller means for rolling the necks of successive folds toward each other, and means for pressing in the direction of the rolling of the roller means successively against the upper and lower recesses of the adjacent side walls of successive U-shaped folds along directions making successive acute and obtuse angles with respect to the flattened neck to form the folds into substantially triangular shape.

5. Apparatus of the character described that comprises, means including scalloped rolls for corrugating a thin sheet into a plurality of successive substantially U-shaped folds with adjacent folds inverted with respect to one another, the neck of each U being substantially flattened, the rolls being provided with means for bowing the side walls of the U with recesses at the upper and lower extremities of the side walls, roller means for rolling the necks of successive folds toward each other, and a pair of cam-operated arms for pressing in the direction of the rolling of the roller means successively against the upper and lower recesses of the adjacent side walls of successive U-shaped folds along directions making successive acute and obtuse angles with respect to the flattened neck to form the folds into substantially triangular shape.

References Cited in the file of this patent

UNITED STATES PATENTS

| | | |
|---|---|---|
| 1,245,450 | Ford | Nov. 6, 1917 |
| 1,741,907 | Beck | Dec. 31, 1929 |
| 1,924,472 | Thomson | Aug. 29, 1933 |
| 2,406,051 | Weiss | Aug. 20, 1946 |
| 2,585,760 | Furrer | Feb. 12, 1952 |